T. J. ALDRIDGE & M. A. REILLY.
SHOE STRETCHER.
APPLICATION FILED MAR. 21, 1910.
960,477.
Patented June 7, 1910.
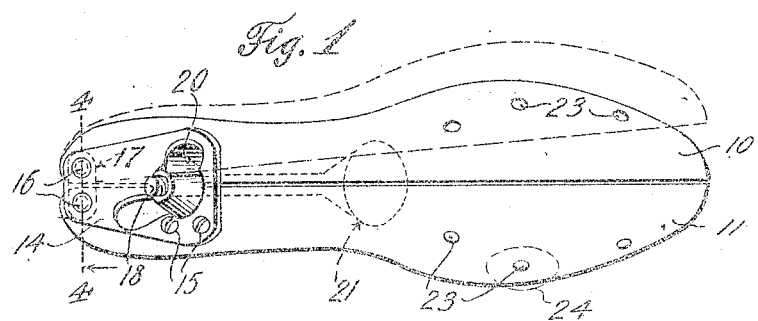
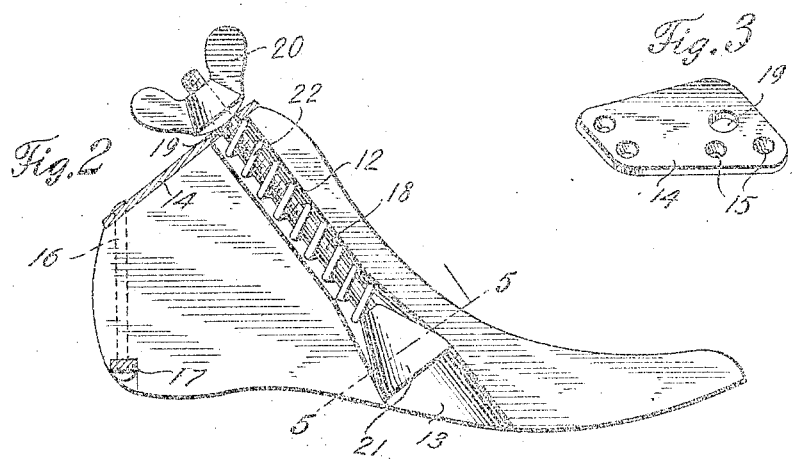
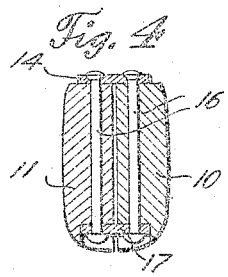
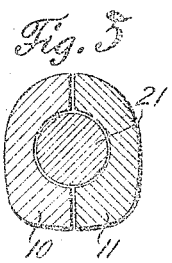
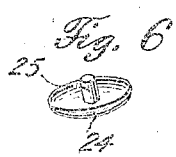

UNITED STATES PATENT OFFICE.

THOMAS J. ALDRIDGE AND MATTHEW A. REILLY, OF ROCHESTER, NEW YORK.

SHOE-STRETCHER.

960,477.  Specification of Letters Patent.  Patented June 7, 1910.

Application filed March 21, 1910. Serial No. 550,754.

*To all whom it may concern:*

Be it known that we, THOMAS J. ALDRIDGE and MATTHEW A. REILLY, citizens of the United States, residing at Rochester, in the county of Monroe and State of New York, have invented certain new and useful Improvements in Shoe-Stretchers, of which the following is a specification.

This invention relates to boot and shoe trees and is designed to construct a device of this nature wherein the tree is operated from above and consequently does not damage the heel and is not interfered with thereby.

With the above and other objects in view, this invention consists of the construction, combination and arrangement of parts all as hereinafter more fully described, claimed and illustrated in the accompanying drawings, wherein:

Figure 1 is a top plan view of a device constructed in accordance with the present invention; Fig. 2 is an elevation of one-half thereof; Fig. 3 is a perspective view of the pivotal plate carried thereby; Fig. 4 is a section; Fig. 5 is a section taken along line 5—5 of Fig. 2; Fig. 6 is a perspective view of a plate adjustably carried by the tree whereby impressions may be made in the shoe for the accommodation of corns, bunions and the like.

The shoe tree forming the subject-matter of the present invention comprises a tree of the usual type constructed in the halves 10 and 11, each of said halves having a passage 12 formed therein, said passages coinciding, which extend obliquely from the upper portion of the tree to the tread thereof. The lower extremity of the passage are flared to form an enlargement which accommodates the spreading member. At the beginning of the passage adjacent to the top of the tree, the same is formed obliquely, and is at approximately right angles to said passage.

A plate 14 is carried by the straight portion, and is rigidly secured by the bolts passing through the openings 15 to the half 11 of the tree. Adjacent to the lower extremity of said plate are secured the pins 16 which pass through each half of the shoe tree and engage the plate 17 countersunk in the lower portion of the heel. These pins form the pivotal connection in combination with the plates between the halves 10 and 11.

A plunger 18 reciprocates in the passage 12 and projects through an opening 19 formed in the plate where it is engaged by the plunger screw 20. At the lower end of this plunger is formed the spreading member 21 which coincides to a certain degree with the slope given the flared portion 13. When the spreading member 21 is drawn toward the plate 14 it will readily be seen that the halves 10 and 11 are separated. A spring 22 operates between the plate 14 and spreading member 21 and normally tends to force the same downward.

In order to provide a means whereby impressions may be made in the shoe to accommodate bunions, corns and the like, a plurality of openings 23 are formed therein. A plate 24 adapted to conform with the contour of bunions and the like is adapted to be carried in said openings by the stud 25 formed on the lower surface thereof.

Having thus described the invention, what we claim as new and desire to secure by Letters Patent of the United States is:

1. A device of the class described formed in halves, each half having a channel formed therein, the lower extremities of said channels being flared, a plate carried by one of said halves, pivotal members passing through said plate connecting said halves, and a plunger reciprocating in said channel carrying a spreading member, said plunger being operated from above.

2. A device of the class described formed in halves, each half having a channel formed therein, said channels being flared at their lower extremities, a plate carried by one of said halves, pivotal members carried by said plate connecting said halves, a plunger carried by said plate and reciprocating in said channel, a spreading member carried at the lower extremity of said plunger, and a spring interposed between said spreading member and the plate.

In testimony whereof we affix our signatures in presence of two witnesses.

THOMAS J. ALDRIDGE.
MATTHEW A. REILLY.

Witnesses:
MARTIN DAVIS,
RAY O'BRIEN.